(12) United States Patent
Bowsher et al.

(10) Patent No.: US 8,632,074 B2
(45) Date of Patent: Jan. 21, 2014

(54) METHOD OF FORMING A BRUSH SEAL

(75) Inventors: Aaron Bowsher, Devizes (GB); Matthew Richard Jenkins, Chippenham (GB)

(73) Assignee: Cross Manufacturing Company (1938) Limited, Bath, Avon (GB)

( * ) Notice: Subject to any disclaimer, the term of this patent is extended or adjusted under 35 U.S.C. 154(b) by 982 days.

(21) Appl. No.: 12/502,414

(22) Filed: Jul. 14, 2009

(65) Prior Publication Data

US 2010/0007091 A1   Jan. 14, 2010

Related U.S. Application Data

(60) Provisional application No. 61/080,399, filed on Jul. 14, 2008.

(51) Int. Cl.
*F16J 15/44* (2006.01)
(52) U.S. Cl.
USPC .......................................................... 277/355
(58) Field of Classification Search
USPC ........................................................... 277/355
See application file for complete search history.

(56) References Cited

U.S. PATENT DOCUMENTS

| | | | |
|---|---|---|---|
| 8,317,464 B2 * | 11/2012 | Alamsetty et al. | 415/170.1 |
| 2002/0063391 A1 * | 5/2002 | Kono | 277/355 |
| 2002/0140175 A1 * | 10/2002 | Kono | 277/355 |
| 2003/0178778 A1 * | 9/2003 | Szymbor et al. | 277/355 |
| 2006/0214378 A1 * | 9/2006 | Zheng | 277/355 |
| 2008/0128995 A1 | 6/2008 | Vallance et al. | |

FOREIGN PATENT DOCUMENTS

| | | |
|---|---|---|
| EP | 1070887 | 1/2001 |
| EP | 1245875 | 10/2002 |
| WO | WO 2008/040944 | 4/2008 |

* cited by examiner

*Primary Examiner* — Gilbert Lee
(74) *Attorney, Agent, or Firm* — King & Schickli, PLLC

(57) ABSTRACT

This invention relates to a method of forming brush seals and to brush seals themselves. Thus a back plate 10, which defines an anchor recess 11, a reservoir recess 12 and a land 13 is laid horizontally. A bristle pack 14 is then laid on top of the back plate 10, so that one end 15 overlies a recess 11 and the other, 16, projects beyond the land 13. The bristles are then clamped in position by clamp 21 and epoxy resin is poured into the recess 11 as indicated by the arrows. A mold is introduced over the recess. Once the resin is cured, the mold can be removed and it will be noted that excess epoxy resin has fallen into the recess 12 preventing resin wicking beyond the land 13 and interfering with the performance of the bristles.

9 Claims, 1 Drawing Sheet

METHOD OF FORMING A BRUSH SEAL

Figure 1:
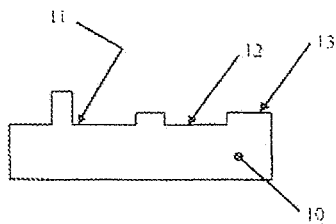

This application claims the benefit of U.S. Provisional Patent Application Ser. No. 61/080,399 filed Jul. 14, 2008, the disclosure of which is incorporated herein by reference.

FIELD OF THE INVENTION

This invention relates to a method of forming brush seals and brush seals.

BACKGROUND OF THE INVENTION

It is well known to form brush seals which incorporate a back plate and a front plate, which together define an opening, which retain one end of an array of bristles which has been enlarged by welding or other material that also joins the bristles together at that end. Commonly the bristles are clamped at the point intermediate their ends between the two plates. The line between the clamping and free movement of the bristles is commonly called the pinch line!

SUMMARY OF THE INVENTION

The applicants have investigated using epoxy resins to form the enlarged end, because it has several advantages over welding and other such operations.

However, in order to properly anchor the bristles, it is necessary to select the epoxy resin so that it will wick between the bristles prior or during curing. It is also in many instances necessary that the epoxy resin has a high melting point.

Experiments carried out by the applicants have shown that in almost all instances where wicking occurs between the bristles, the epoxy resin also wicks right down the bristles, past the pinch line, with the result that the bristles are lumped together below the pinch line and the seal cannot detect and essentially ceases to be a brush seal.

From one aspect the invention consists in a method of forming a brush seal including:
(a) forming a back plate having in general longitudinal alignment a first bristle anchor recess; a second reservoir recess and a land for clamping the bristles;
(b) laying the back plate horizontally and laying a brush of bristles such that one end of the bristles overlies the anchor reservoir and the other extends beyond the land;
(c) locating a mould of the anchor reservoir and filling the mould and the anchor reservoir with an epoxy resin capable of wicking between the bristles;
(d) curing the epoxy resin; and
(e) attaching a front plate to the back plate to clamp the bristles against the land at a pinch line;
wherein the dimensions of the second reservoir recess are such that the epoxy resin does not wick beyond the pinch line.

The epoxy resin preferably has a melting point above 175° c. and conveniently the melting point may be between 200° c. and 300° c. The reservoir recess may be between 8 mm and 12 mm long.

The invention also consists in a brush seal having a back plate and a front plate together defining an anchor opening 18 and a spaced clamp 22; a set of bristles joined at one end by an enlarged head retained in the opening to secure the bristles and clamped by the clamp intermediate its ends at a pinch line; the enlarged head being formed by epoxy resin characterised in that the back plate further includes a reservoir recess for receiving wicked epoxy resin from the bristles and thereby preventing the wicking of resin beyond the pinch line.

Although the invention has been defined above it is to be understood it includes any inventive combination of the features set out above or in the following description.

The invention may be performed in various ways and specific embodiments will now be described by way of example with reference to the accompanying drawing which illustrates the method of the invention sequentially.

DETAILED DESCRIPTION OF THE INVENTION

Thus in FIG. 1 a back plate 10 has been formed and laid horizontally. The backplate 10 defines an anchor recess 11 a reservoir recess 12 and a land 13.

Figure 2:
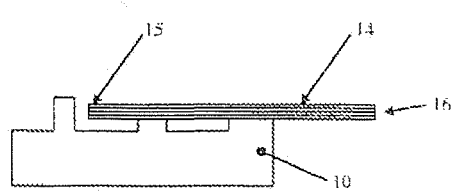

In FIG. 2 a bristle pack 14 has been laid on top of the back plate 10 so that one end 15 overlies the recess 11 and the other end 16 projects beyond the land 30.

Figure 3:
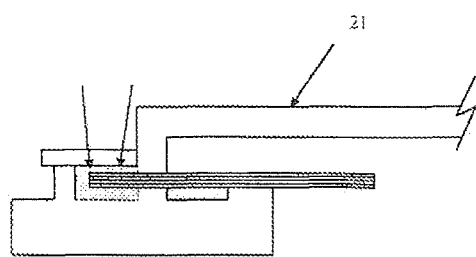

In FIG. 3 a mould is introduced over the recess 11 and epoxy resin is poured in as indicated by the arrows.

Figure 4:
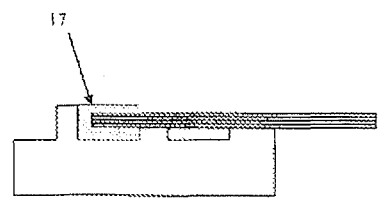

Turning to FIG. 4 mould has been removed and the epoxy resin cured to form a lump 17 which constitutes a head on the bristles 14. It will be noticed that some epoxy resin has wicked down the bristles but has then fallen under gravity into the recess 12 preventing material wicking beyond the land 13.

Figure 5:
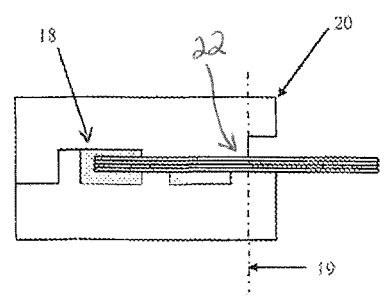

In FIG. 5 a front plate has been assembled onto the back plate capturing the head 17 and clamping the bristles 14 onto the land 13 at the pinch line 19. In use the final brush seal indicated at 20 may be orientated in any desirable manner.

It will be understood that the back plate could take other forms and that is shown in the drawing and the length of the recess 12 will be determined by the wicking characteristics of the epoxy resin. However in experiments a reservoir of around 10 mm in length has proved practical.

The invention claimed is:

1. A method of forming a brush seal including:
(a) forming a back plate of a single material having in general longitudinal alignment a first bristle anchor recess; a second reservoir recess and a land for clamping the bristles;
(b) laying the back plate horizontally and laying a brush of bristles such that one end of the bristles overlies the anchor reservoir and the other extends beyond the land;
(c) locating a mould of the anchor reservoir and filling the mould and the anchor reservoir with an epoxy resin capable of wicking between the bristles;
(d) curing the epoxy resins and
(e) attaching a front plate to the back plate to clamp the bristles against the land at a pinch line, wherein free movement of the bristles is prevented on a first side of the pinch line and free movement of the bristles is allowed on a second side of the pinch line, and wherein the dimensions of the second reservoir recess are such that the epoxy resin does not wick beyond the pinch line.

2. A method as claimed in claim 1 wherein the epoxy resin has an operating temperature of approximately 550° F. (288° C.).

3. A method as claimed in claim 2 wherein the epoxy resin glass transition temperature may be between 500° F. (260° C.) and 572° F. (300° C.).

4. A method as claimed in claim wherein the reservoir recess is between 8 mm and 12 mm long.

5. A brush seal having:
a back plate of a single material and a front plate together defining an anchor opening and a spaced clamp;
a set of bristles joined at one end by an enlarged head retained in the opening to secure the bristles and clamped by the clamp intermediate its ends at a pinch line, wherein free movement of the bristles is prevented on a first side of the pinch line and free movement of the bristles is allowed on a second side of the pinch line, and wherein the enlarged head is formed by epoxy resin;

characterised in that the back plate further includes a reservoir recess positioned between the anchor opening and the pinch line, said reservoir recess for receiving wicked epoxy resin from the bristles and thereby preventing the wicking of resin beyond the pinch line.

6. The brush seal of claim 5, wherein the anchor opening is at least partially formed by an anchor recess in the back plate.

7. The brush seal of claim 5, wherein the hack plate further includes a flat portion defining a land for at least partially defining the clamp with the front plate.

8. The brush seal of claim 7, wherein the land is raised relative to the reservoir recess.

9. The brush seal of claim 5, wherein the front plate contacts the bristles at a point directly opposite the reservoir recess.

\* \* \* \* \*